(12) United States Patent
Leong

(10) Patent No.: US 10,264,024 B2
(45) Date of Patent: Apr. 16, 2019

(54) WIRELESS PERIPHERAL ADMINISTRATION

(71) Applicant: Google Inc., Mountain View, CA (US)

(72) Inventor: Jian Wei Leong, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 99 days.

(21) Appl. No.: 15/159,749

(22) Filed: May 19, 2016

(65) Prior Publication Data

US 2017/0339189 A1    Nov. 23, 2017

(51) Int. Cl.
| | |
|---|---|
| H04L 29/00 | (2006.01) |
| H04L 29/06 | (2006.01) |
| H04W 12/04 | (2009.01) |
| H04W 76/14 | (2018.01) |
| H04L 12/24 | (2006.01) |
| G06F 9/4401 | (2018.01) |
| G06F 8/654 | (2018.01) |
| G06F 8/65 | (2018.01) |

(52) U.S. Cl.
CPC ............ *H04L 63/20* (2013.01); *G06F 8/654* (2018.02); *G06F 9/4411* (2013.01); *H04L 41/0893* (2013.01); *H04L 63/101* (2013.01); *H04L 63/1433* (2013.01); *H04W 12/04* (2013.01); *H04W 76/14* (2018.02); *G06F 8/65* (2013.01)

(58) Field of Classification Search
CPC .... H04L 63/20; H04L 41/0893; H04L 63/101
USPC .......................................................... 726/1
See application file for complete search history.

(56) References Cited

U.S. PATENT DOCUMENTS

| | | | |
|---|---|---|---|
| 7,076,536 B2* | 7/2006 | Chiloyan | G06F 9/4411 |
| | | | 709/220 |
| 7,215,649 B2 | 5/2007 | Yu et al. | |
| 9,438,628 B2* | 9/2016 | Haridas | H04L 63/20 |
| (Continued) | | | |

FOREIGN PATENT DOCUMENTS

| | | | | |
|---|---|---|---|---|
| CN | 102594987 A | | 7/2012 | |
| WO | WO 2012176922 A1 * | | 12/2012 | G06F 21/57 |

OTHER PUBLICATIONS

Yang, et al., "Bluetooth Security," retrieved May 2016 from http://www.it.uu.se/edu/course/homepage/sakdat/ht07/pm/programme/bluetooth.pdf.

(Continued)

*Primary Examiner* — Brandon S Hoffman
*Assistant Examiner* — Michael D Anderson
(74) *Attorney, Agent, or Firm* — Morgan, Lewis & Bockius LLP

(57) ABSTRACT

Aspects of the subject technology relate to administration of wireless peripheral devices. A computer-implemented method includes connecting to a peripheral device through a first connection, and determining a peripheral identifier corresponding to the peripheral device. The method further includes associating the peripheral identifier with a device identifier corresponding to a user device and sending an updated policy based on the association between the peripheral identifier and the device identifier to the peripheral device through the first connection. The method further includes pairing, through the first connection, the peripheral device and the user device based on the updated policy to establish a second connection between the peripheral device and the user device.

20 Claims, 5 Drawing Sheets

(56) References Cited

U.S. PATENT DOCUMENTS

2013/0337739 A1   12/2013  Bernsen et al.
2014/0235166 A1    8/2014  Molettiere et al.
2015/0081763 A1    3/2015  Sipola et al.
2015/0180842 A1    6/2015  Panther

OTHER PUBLICATIONS

International Search Report and Written Opinion dated Feb. 20, 2017, which issued in International Application No. PCT/US2016/067355.
Written Opinion of the International Preliminary Examining Authority from PCT/US2016/067355, dated Apr. 11, 2018, 7 pages.

* cited by examiner

WIRELESS PERIPHERAL ADMINISTRATION

BACKGROUND

The present disclosure relates generally to administration of wireless peripheral devices and more particularly, remotely and securely managing wireless peripheral devices in an enterprise setting.

Wireless peripheral devices, such as keyboards, mice, headsets, etc., provide the convenience of connectivity to user devices without using physical ports to connect. However, the wireless connection may provide an attack vector for malicious parties. For instance, the pairing process for wireless peripheral devices may pose a security threat due to the many chances for human error which may be exploited. In secure settings, such as enterprise settings, wireless peripheral devices may not be deployed due to the security threat posed by the pairing process. Remote management of wireless peripheral devices may also be difficult in enterprise settings.

SUMMARY

Aspects of the subject technology relate to a method and system for administration of wireless peripherals. The method comprises connecting to a peripheral device through a first connection and determining a peripheral identifier corresponding to the peripheral device. The method further comprises associating the peripheral identifier with a device identifier corresponding to a user device and sending an updated policy, based on the association between the peripheral identifier and the device identifier, to the peripheral device through the first connection. The updated policy permits a second connection between the peripheral device and the user device. The method also comprises pairing, through the first connection, the peripheral device with the user device based on the updated policy to establish a second connection between the peripheral device and the user device.

Aspects of the subject technology also relate to a non-transitory machine-readable medium including instructions stored therein, which when executed by a machine, cause the machine to perform operations. The operations comprise connecting to a peripheral device through a first connection, and determining a peripheral identifier corresponding to the peripheral device. The operations further comprise updating a policy corresponding to the peripheral device to associate the peripheral device with a user device and sending the updated policy to the peripheral device through the first connection. The operations also comprise pairing, through the first connection, the peripheral device with the user device based on the updated policy to establish a second connection between the peripheral device and the user device, and disconnecting from the peripheral device to terminate the first connection.

Aspects of the subject technology also relate to a system. The system includes one or more processors and a non-transitory computer-readable medium comprising instructions stored therein, which, when executed by the one or more processors, cause the one or more processors to perform operations. The operations comprise connecting to a management server, connecting to a peripheral device through a first connection, and sending a peripheral identifier corresponding to the peripheral device to the management server. The operations further comprise associating the peripheral identifier with a device identifier corresponding to a user device, and sending an updated policy, based on the association between the peripheral identifier and the device identifier, from the management server to the peripheral device through the first connection. The operations also comprise pairing, through the first connection, the peripheral device with the user device based on the updated policy to establish a second connection between the peripheral device and the user device, and disconnecting from the peripheral device to terminate the first connection.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

According to various aspects of the subject technology, systems and methods for remote administration of wireless peripheral devices are provided. In an enterprise setting, a management server manages administrative policies for user devices. Policies may include, for example, allocation or access rights, enabling or disabling functions, etc. The policies may be administered through administrative or "admin" devices, which are connected to the management server and further connect to user devices to push policies from the management server to the user devices.

Figure 1A:
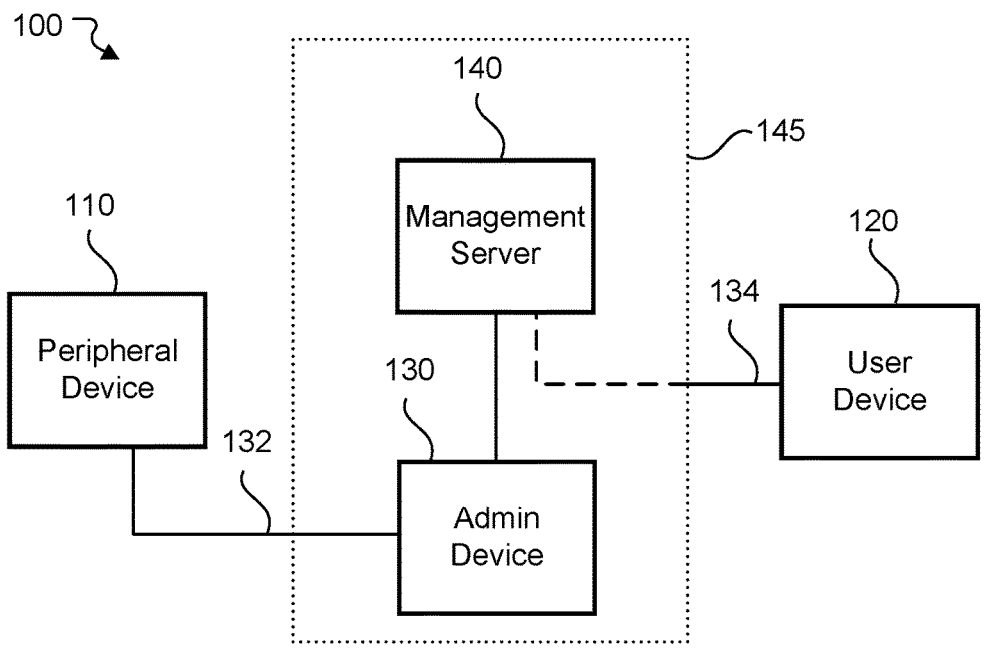
FIG. 1A illustrates an enterprise environment according to example aspects of the present disclosure.
Figure 1B:
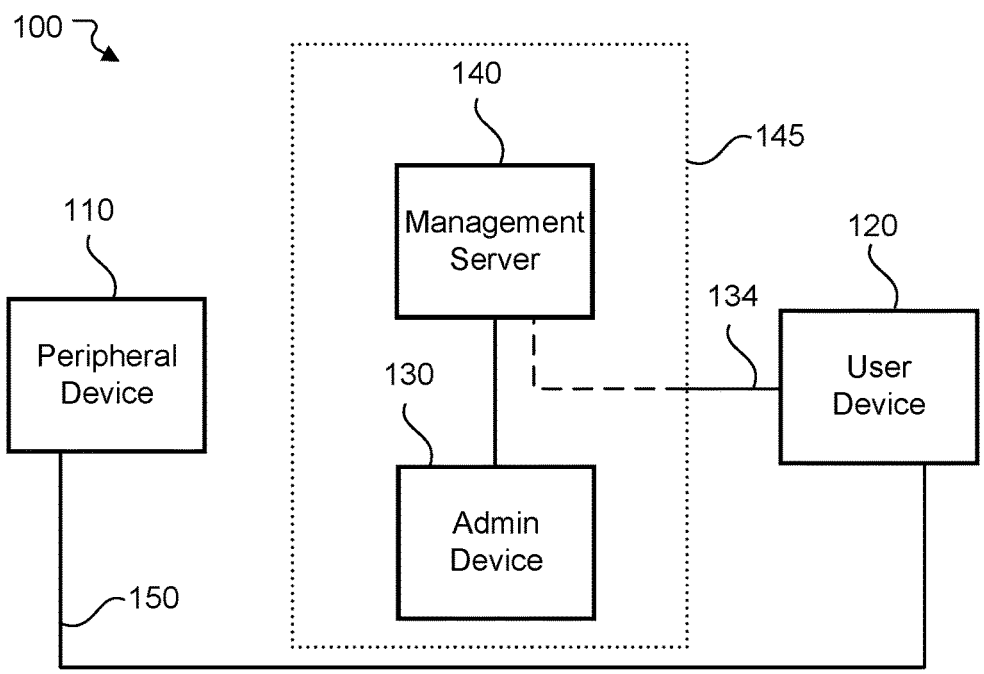
FIG. 1B shows the enterprise environment of FIG. 1A with a peripheral device connected to a user device according to example aspects of the present disclosure.
Figure 1C:
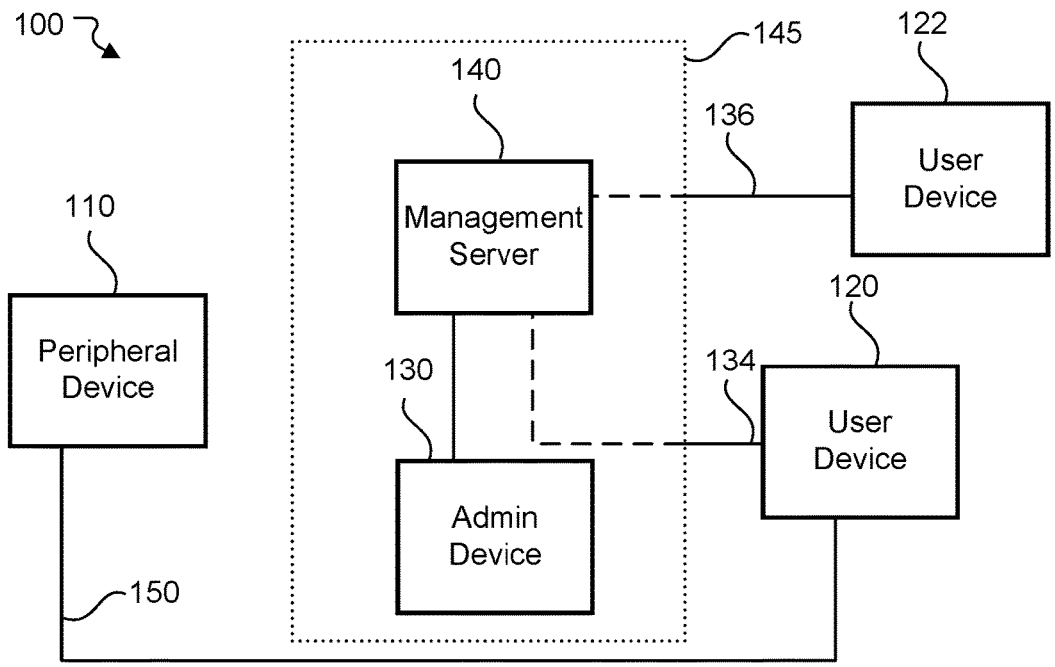
FIG. 1C shows the enterprise environment of FIG. 1A with a second user device added according to example aspects of the present disclosure.

FIGS. 1A-1D illustrate an enterprise environment 100 with which some implementations of the subject technology can be implemented. In FIGS. 1A and 1B, the enterprise environment 100 comprises a peripheral device 110, a user device 120, and a management system 145.

The management system 145 manages all user devices in the enterprise environment 100 and comprises an admin device 130 connected to a management server 140. The management server 140 comprises policies for administration of user devices, such as the user device 120, and may be a dedicated server for maintaining the policies. The admin device 130 may be a device used by an administrator for localized administration of user devices and may provide an interface for modifying and maintaining the policies on the management server 140. The admin device 130 may be, for example, a laptop or mobile device to allow the administrator to move to different locations for device administration. The management system 145 may comprise the admin device 130 and the management server 140, as illustrated, but alternatively may comprise a single device or server acting as both the management server 140 and the admin device 130, or may comprise more than one of the management server 140 and/or admin device 130.

The user device 120 is connected to the management system 145 through a connection 134, which may comprise a direct connection to the management server 140. Alternatively, the user device 120 may be indirectly connected to the management server 140 through the admin device 130 or other intervening devices. In certain implementations, the user device 120 may be the admin device 130. The user device 120 may be, for example, a client device such as a laptop or desktop computer, mobile device, or other computing device. The administrator may manage the user device 120 through the admin device 130, which may push policies from the management server 140 to the user device 120. However, similar remote management of the peripheral device 110 may not be conventionally available. For instance, the peripheral device 110 may not be able to directly connect to the management server 140. In addition, the peripheral device 110 may use wireless connections which do not afford the same level of security as the connection 134 used by the user device 120. The connection 134 may be a wired or wireless connection used for wide area networks (WANs) whereas the peripheral device 110 may use short distance wireless protocols used for personal area networks (PANs).

Figure 2A:
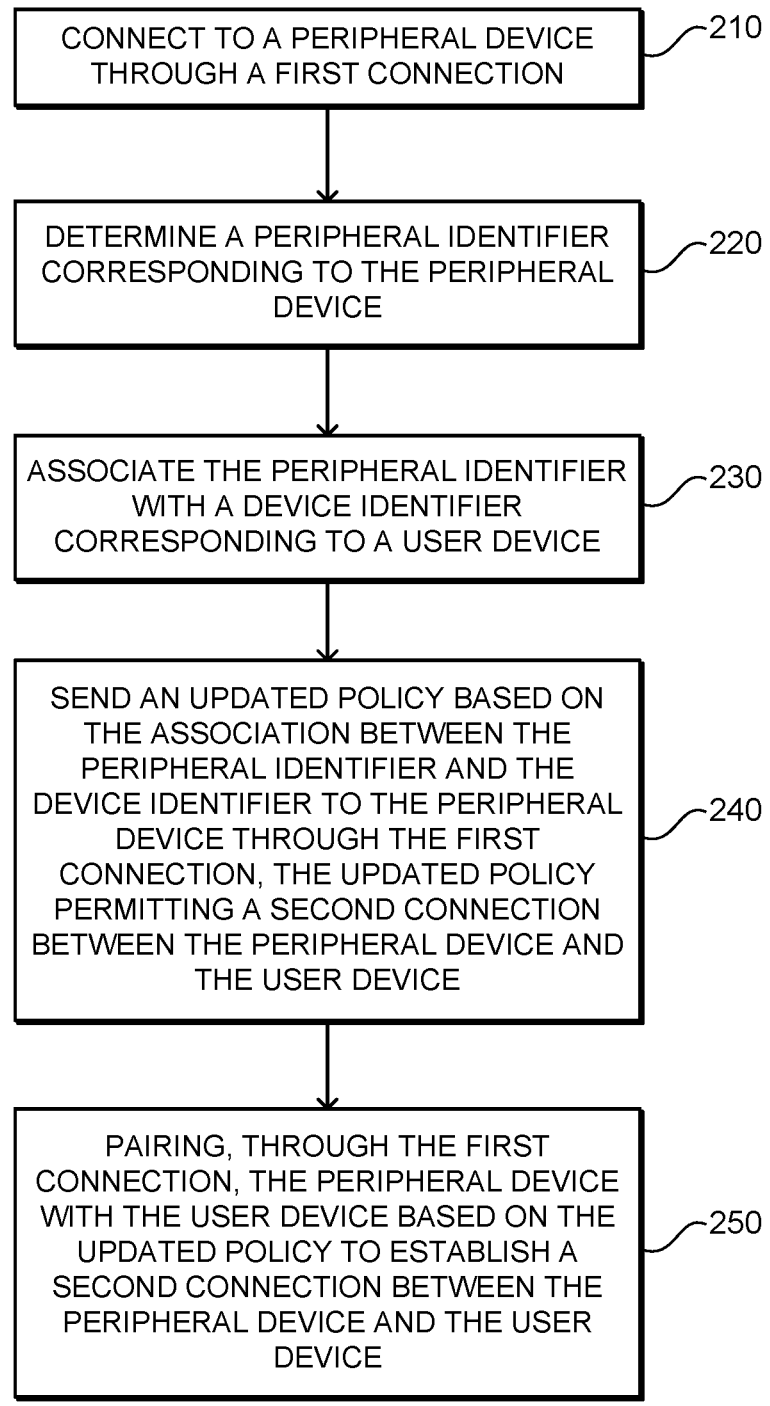
FIG. 2A is a flowchart illustrating a process for enrolling and allocating a peripheral device to a user device according to example aspects of the present disclosure.

For remote management of wireless peripheral devices, according to aspects, the peripheral device 110 may need to be initially enrolled. The enrollment and allocation of the peripheral device 110 are described with respect to FIGS. 1A, 1B, and 2A. FIG. 2A depicts a flowchart 201 of an enrollment and allocation process according to aspects.

A peripheral device is connected to through a first connection, at block 210. The peripheral device 110 may be a wireless peripheral device, such as a keyboard or headset, which may connect wirelessly or may have one or more ports for physical connection. The admin device 130 connects to the peripheral device 110 through a connection 132. The peripheral device 110 connects to the management system 145 by way of the connection 132 and the admin device 130, which is connected to the management server 140. The connection 132 may be a wireless connection, such as a short distance wireless connection commonly used for wireless peripheral devices. Alternatively, the connection 132 may be a physical connection, such as the peripheral device 110 plugging into a port of the admin device 130 or a cable connection.

The peripheral device 110 initially pairs to the admin device 130. The pairing allows the two devices to recognize each other for a subsequent connection. The pairing process may include a security handshake operation between the peripheral device 110 and the admin device 130, in which one or more keys are exchanged between the two devices. The security handshake operation may be performed over the connection 132.

This pairing process may be secure as the administrator may directly use a unique identifier, such as a media access control (MAC) address, of the peripheral device 110 and eliminate the need for discovery mode and candidate selection during the pairing process. The peripheral device 110 may be configured from the factory to disable discovery mode for pairing. However, the administrator may alternatively pair the peripheral device 110 to the admin device 130 through discovery mode.

At block 220, a peripheral identifier corresponding to the peripheral device is determined. Once the peripheral device 110 is paired to the admin device 130, a unique identifier may be sent to the management server 140 to complete enrollment. The MAC address or other unique identifier corresponding to the peripheral device 110 may be sent to the management server 140 from the admin device 130. In certain implementations, the admin device 130 may read or otherwise obtain the unique identifier from the peripheral device 110.

The peripheral device 110 may now have a secure channel with the management system 145. For example, the connection 132 may provide a secure connection between the peripheral device 110 and the admin device 130, and the admin device 130 may have a secure connection with the management server 140 such that a secure channel is established between the peripheral device 110 and the management server 140 by way of the admin device 130.

To ensure a trusted channel—in which only trusted devices are securely connected to and a secure channel is not established with a wrong or malicious device—the peripheral device 110 may adhere to several rules. First, the peripheral device 110 may initially pair with the admin device 130. For increased security, the peripheral device 110 may be pre-configured to only pair with the admin device 130, initially. Second, new pairings can only be initiated by currently paired trusted devices. In addition, new pairings must be initiated through the management server 140, which can approve the new pairings. Third, the peripheral device 110 may subsequently pair only with trusted devices, such as the admin device 130 or potentially the user device 120. The management server 140 may indicate what devices are trusted devices.

At block 230, the peripheral identifier is associated with a device identifier corresponding to a user device. At block 240, an updated policy based on the association between the peripheral identifier and the device identifier is sent to the peripheral device through the first connection, wherein the updated policy permits a second connection between the peripheral device and the user device.

The management system 145 may allocate the peripheral device 110 to a user, such as a user associated with the user device 120. The management server 140 associates the unique identifier of the peripheral device 110 with a unique identifier of the user device 120. The unique identifier of the user device 120 may be a MAC address or other identifier. The association between the peripheral device 110 and the user device 120 may be based on the user associated with the user device 120. For instance, the peripheral device 110 may be associated with the user who is associated with the user device 120, such that the peripheral device 110 is associated with all devices associated with the user, to determine the association between the peripheral device 110 and the user device 120. This association between the peripheral device 110 and the user device 120 may be stored on the management server 140. This association may also be pushed to one or both of the peripheral device 110 and the user device 120. For example, this association may be stored in updated local policies, such as the whitelist, to be pushed to the peripheral device 110 and/or the user device 120. This association may comprise information necessary for pairing the peripheral device 110 to the user device 120.

The management server 140 may approve this association, for example, by determining whether there are conflicts with the association and subsequently storing the association when no conflicts occur.

With the establishment of the secure channel, local policies for the peripheral device 110 may be updated through the secure channel. The peripheral device 110 may store local policies, such as in a local storage of the peripheral device 110, or in a firmware of the peripheral device 110. The peripheral device 110 may indicate that its local policies are dirty or old and need to be updated. Alternatively, the management server 140 may keep track of updates performed and may determine that the peripheral device 110 may need updated policies. Updated local policies and/or updated firmware may be pushed from the management server 140 to the peripheral device 110 through the admin device 130 and may be locally stored in the peripheral device 110. Updated local policies and/or updated firmware for the user device 120 may be pushed to the user device 120.

Local policies may include enabling or disabling of features of the peripheral device 110, which may be stored as flags or bits. For example, discovery mode and candidate selection may be disabled, and pairing may otherwise be disabled. Device settings may be altered, such as tuning radio frequency (RF) power from class 1 power to class 2 power. The local policies may also comprise a whitelist and/or a blacklist. The whitelist may contain devices with which the peripheral device 110 may pair or otherwise connect with. The blacklist may contain devices with which the peripheral device 110 is restricted from pairing or connecting with.

At block 250, the peripheral device and the user device are paired through the first connection based on the updated policy to establish a second connection between the peripheral device and the user device. The pairing between the peripheral device 110 and the user device 120 may include a security handshake operation in which one or more keys are exchanged. The peripheral device 110 is paired with the user device 120 through the management system 145 as a secure channel. For instance, the admin device 130 may act as a proxy to a pairing server to pair the peripheral device 110 to the user device 120 out-of-band. Once the peripheral device 110 and the user device 120 are paired, they may establish a connection, such as a connection 150, to communicate and exchange data.

Although FIG. 2A depicts blocks 210-250 in one sequence, in other implementations the sequence may vary, and certain blocks may be optional. For instance, block 220 may occur before block 210 such that the peripheral identifier may be determined prior to connecting to the peripheral device. In addition, block 250 may occur before block 240, or the block 240 may be optional.

The local policies for the peripheral device 110 may include disabling manual pairing, discovery, and scanning such that the peripheral device 110 must be paired out-of-band. Alternatively, the local policies for the peripheral device 110 may include whitelists or blacklists to restrict which devices the peripheral device 110 may pair with. The whitelist may then comprise the user device 120. In some implementations, the user device 120 may initiate the pairing process with the peripheral device 110. In other implementations, the peripheral device 110 may initiate the pairing process. The discovery mode may be used, in which whitelisted devices appear as candidates, and blacklisted devices are explicitly excluded as candidates. However, an explicit policy which enforces the association between the peripheral device 110 and the user device 120 may not be necessary. By pairing the peripheral device 110 with the user device 120, and restricting the peripheral device 110 from pairing with other devices—unless explicitly initiated by an admin through the management system 145—the association between the peripheral device 110 and the user device 120 may be implicitly enforced.

In addition, changes to the local policies may be based on changes to system-wide or global policies. For instance, the global policy may be changed, which applies to all devices, or a category or subset of all devices. The updated global policy itself may be pushed to affected devices, or the local policies of affected devices may be updated based on the updated global policy.

Once the peripheral device 110 is paired to the user device 120, the connection 150 may be established between the peripheral device 110 and the user device 120, as seen in FIG. 1B. The connection 150 is a wireless connection. In certain implementations, the connection 150 may be automatically established once the peripheral device 110 is within range of the user device 120. Optionally, the peripheral device 110 may no longer be connected to the management system 145, for example by disestablishing or terminating the connection 132 to the admin device 130. For example, if the peripheral device 110 was wirelessly connected to the admin device 130 via the connection 132, the connection 132 may need to be terminated before establishing the connection 150.

Although the termination of the connection 132 also terminates the previously-established secure channel, the connection 150 establishes a new secure channel. Since the peripheral device 110 initially paired with the admin device 130, and the management server 140 has indicated that the user device 120 is a trusted device and has approved the pairing, the peripheral device 110 maintains a secure channel with the management server 140. As seen in FIG. 1B, the peripheral device 110 is connected to the management server 140 through the user device 120.

Future updates to policies for the peripheral device 110 may be administered from the management system 145 to the peripheral device 110 through the user device 120. For example, the management server 140 may send updated policies for the peripheral device 110 through the user device 120, which may use the connection 150 to push the policies to the peripheral device 110. The user device 120 is connected to the management system 145, for example connected to the management server 140, or connected to the management server 140 through the admin device 130.

Once the peripheral device 110 has established the connection 150 with the user device 120, subsequent administration of the peripheral device 110 may be performed through the user device 120 and the connection 150 such that the peripheral device 110 does not require a connection to the admin device 130 and further does not require a direct connection to the management server 140. For instance, the peripheral device 110 may not be configured to connect to a wide area network (WAN) or the internet. The user device 120 may act as a proxy. The user device 120 may further be configured to recognize when the policies of the peripheral device 110 are out of date and automatically push updates to the peripheral device 110. The user device 120 may, in conjunction with the management server 140, maintain and distribute updated policies. When the administrator changes policies, which may be local to the peripheral device 110 or may be system-wide, the management server 140 and/or the user device 120 may determine that the changed policies affect the peripheral device 110 and subsequently push updated policies, for example through the connection 150.

Figure 2B:
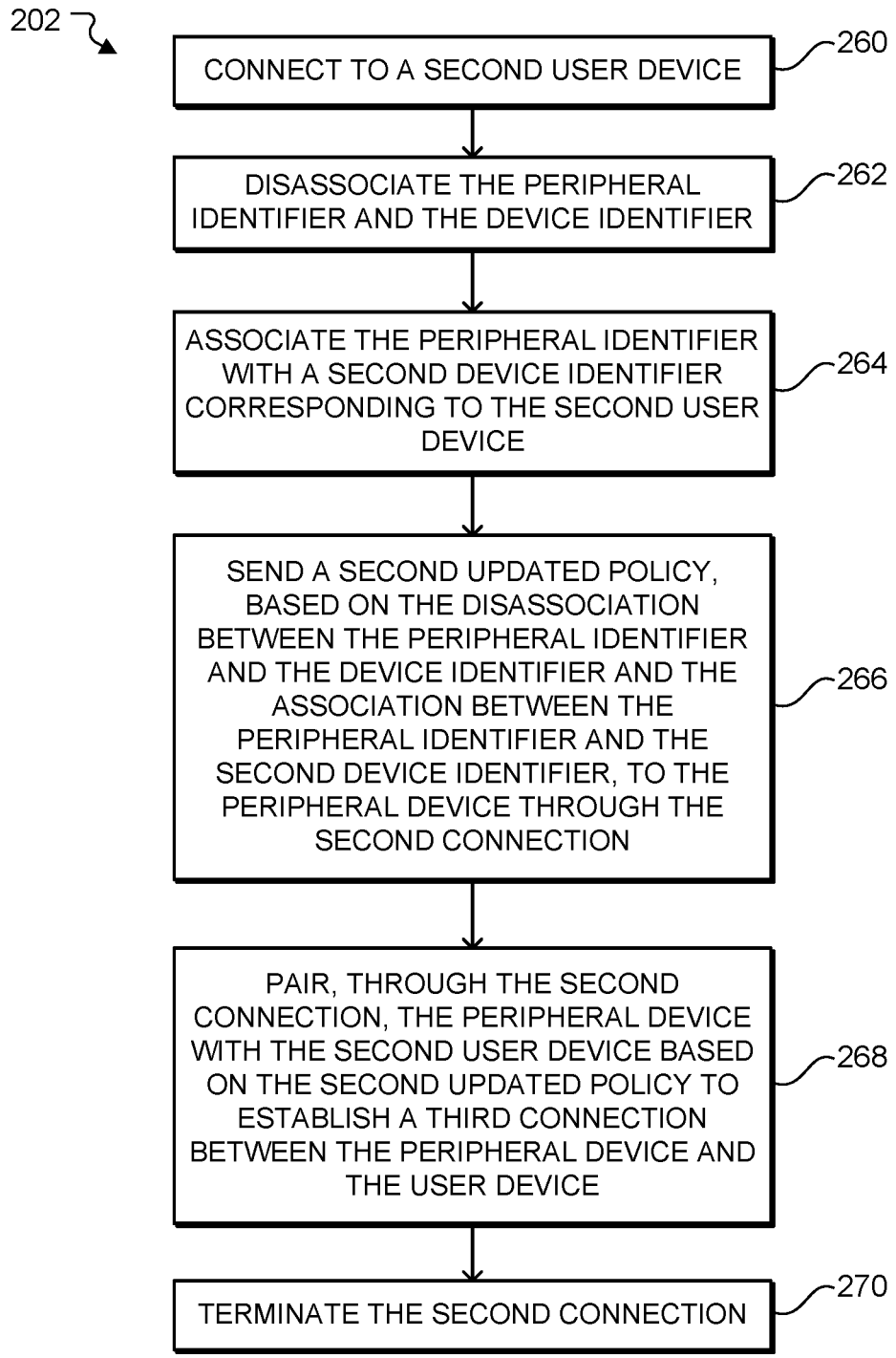
FIG. 2B is a flowchart illustrating a process for allocating a peripheral device to a second user device according to example aspects of the present disclosure.

The management system 145 may also reallocate the peripheral device 110 to another user or user device. For example, the management server 140 may remove the current pairing and allocation and push a new pairing and allocation to the peripheral device 110 through the user device 120. FIG. 2B shows a flowchart 202 of a process for reallocation, according to aspects.

A second user device is connected to, at block 260. For example, in FIG. 1C, a user device 122 connects to the management system 145 through a connection 136, which may be wired or wireless. Alternatively, the user device 122 may connect to the admin device 130 or the user device 120. Although FIG. 2B depicts block 260 first, in other implementations the user device 122 may connect to the management system 145 when the peripheral device 110 is ready to pair with the user device 120, for example at any time before block 268 described below.

At block 262, the peripheral identifier is disassociated from the device identifier from block 230 of FIG. 2A. The local policies for the peripheral device 110 may be updated to deallocate the peripheral device 110 from the user device 120. For example, the association between the peripheral device 110 and the user device 120 may be removed, such as from the local policies for the peripheral device 110 and/or the user device 120. Alternatively, the user device 120 may be removed from the whitelist of the peripheral device 110 and optionally added to the blacklist of the peripheral device 110. The disassociation may be based on the user of the user device 120 such that the peripheral device 110 is disassociated from all devices associated with the user of the user device 120.

At block 264, the peripheral identifier is associated with a second device identifier corresponding to the second user device. Similar to block 230 in FIG. 2A, the peripheral device 110 may be associated with the user device 122 by associating the peripheral identifier with a unique identifier corresponding to the user device 122. The peripheral device 110 may be associated with a user of the user device 122 such that the peripheral device 110 is associated with all devices associated with the user of the user device 122.

At block 266, a second updated policy, based on the disassociation between the peripheral identifier and the device identifier and the association between the peripheral identifier and the second device identifier is sent to the peripheral device through the second connection. The updated policy may reflect the disassociation of the peripheral device 110 from the user device 120 and the association of the peripheral device 110 to the user device 122. The secure channel from the management server 140 to the peripheral device 110 by way of the user device 120 is still established, and the updated policies may be pushed through this secure channel. Accordingly, the peripheral device 110 is not required to connect directly to the management system 145 in order to receive updates.

At block 268, the peripheral device is paired, through the second connection, with the second user device based on the second update policy to establish a third connection between the peripheral device and the second user device. The peripheral device 110 may be paired out-of-band to the user device 122, which includes a security handshake operation based on the association between the peripheral device 110 and the user device 122.

Figure 1D:
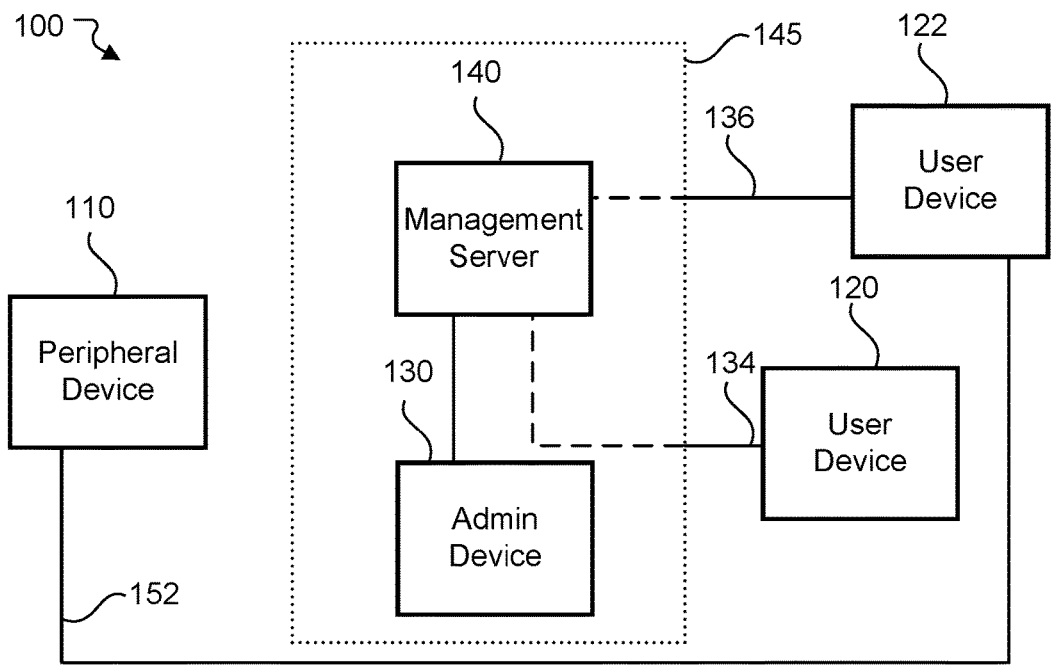
FIG. 1D shows the enterprise environment of FIG. 1A with the peripheral device connected to the second user device according to example aspects of the present disclosure.

At block 270, the connection between the peripheral device and the user device is terminated. As seen in FIG. 1D, the connection 150 between the peripheral device 110 and the user device 120 may be terminated. The connection 150 may be automatically terminated. For example, the peripheral device 110 and/or the user device 120, in response to the updated policy, may terminate the connection 150 as the policies indicate the connection 150 is no longer permitted, or the connection 150 may be terminated in response to pre-pairing if performed at block 266. Alternatively, the peripheral device 110 and/or the user device 120 may receive instructions to terminate the connection 150 along with the updated policy. As seen in FIG. 1D, the peripheral device 110 may then establish a connection 152 with the user device 122. The connection 152 may be wireless. If not pre-paired, for example at block 268, establishing the connection may include pairing.

The connection 152 provides a new secure channel between the peripheral device 110 and the management server 140. Future updates, such as changes to local and/or global policies or updates to firmware, may now be pushed through the user device 122, for example through the connection 152. Thus, aspects of the present disclosure provide remote management and administration of wireless peripheral devices.

Figure 3:
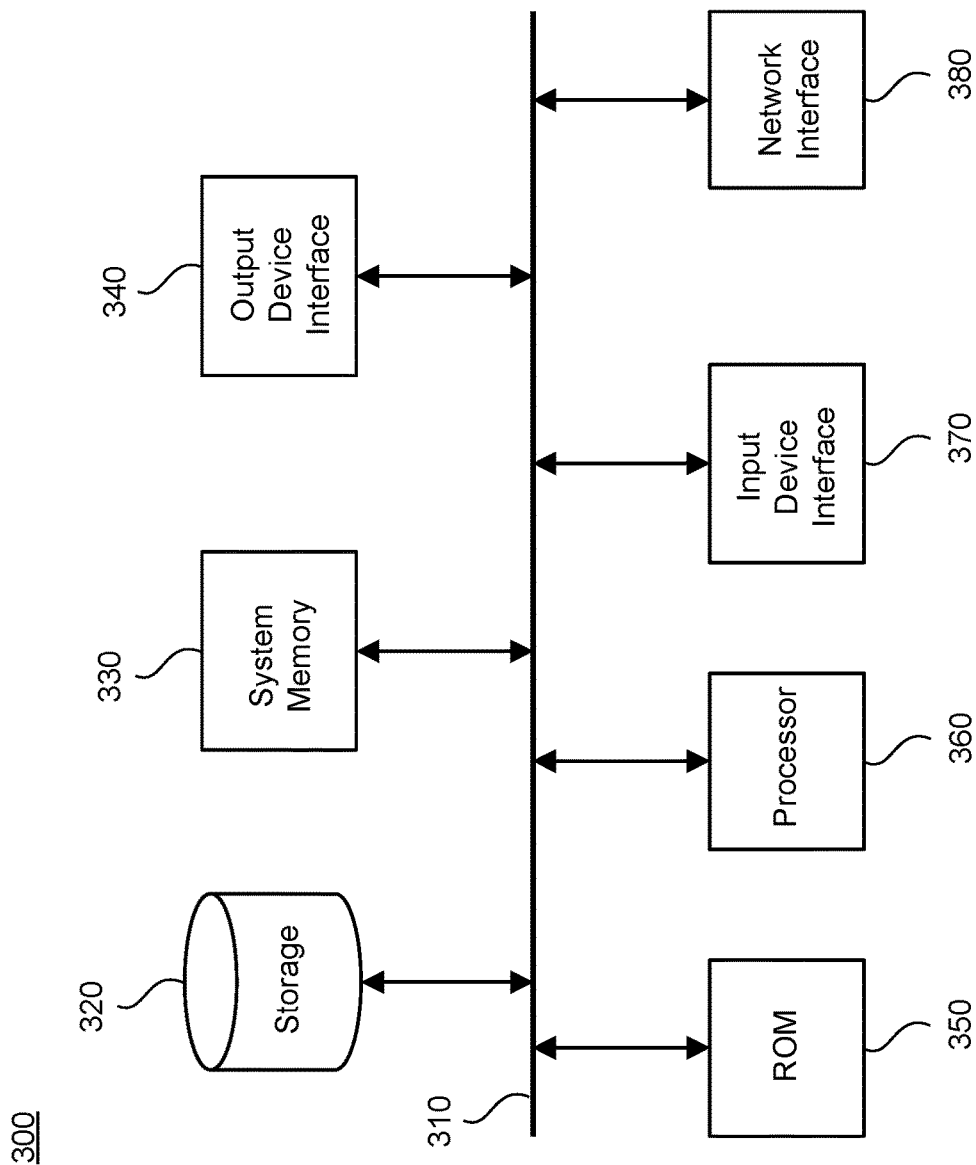
FIG. 3 shows a diagram of an electronic system according to example aspects of the present disclosure.

FIG. 3 conceptually illustrates an example electronic system with which some implementations of the subject technology can be implemented. Electronic system 300 can be a computer, phone, PDA, or any other sort of electronic device, including an admin device, a user device, or a peripheral device. Such an electronic system includes various types of computer readable media and interfaces for various other types of computer readable media. Electronic system 300 includes a bus 310, processing unit(s) 360, a system memory 330, a read-only memory (ROM) 350, a permanent storage device 320, an input device interface 370, an output device interface 340, and a network interface 380.

Bus 310 collectively represents all system, peripheral, and chipset buses that communicatively connect the numerous internal devices of electronic system 300. For instance, bus 310 communicatively connects processing unit(s) 360 with ROM 350, system memory 330, and permanent storage device 320.

From these various memory units, processing unit(s) 360 retrieves instructions to execute and data to process in order to execute the processes of the subject disclosure. The processing unit(s) can be a single processor or a multi-core processor in different implementations.

ROM 350 stores static data and instructions that are needed by processing unit(s) 360 and other modules of the electronic system. Permanent storage device 320, on the other hand, is a read-and-write memory device. This device is a non-volatile memory unit that stores instructions and data even when electronic system 300 is off. Some implementations of the subject disclosure use a mass-storage device (for example, a magnetic or optical disk and its corresponding disk drive) as permanent storage device 320.

Other implementations use a removable storage device (for example, a floppy disk, flash drive, and its corresponding disk drive) as permanent storage device 320. Like permanent storage device 320, system memory 330 is a read-and-write memory device. However, unlike storage device 320, system memory 330 is a volatile read-and-write memory, such as a random access memory. System memory 330 stores some of the instructions and data that the processor needs at runtime. In some implementations, the processes of the subject disclosure are stored in system memory 330, permanent storage device 320, or ROM 350. For example, the various memory units include instructions for connecting to a peripheral device, enrolling the peripheral device, and allocating the peripheral device. From these various memory units, processing unit(s) 360 retrieves instructions to execute and data to process in order to execute the processes of some implementations.

Bus 310 also connects to input and output device interfaces 370 and 340. Input device interface 370 enables the user to communicate information and select commands to the electronic system. Input devices used with input device interface 370 include, for example, alphanumeric keyboards and pointing devices (also called "cursor control devices"). Output device interfaces 340 enables, for example, the display of images generated by the electronic system 300. Output devices used with output device interface 340 include, for example, printers and display devices, for example, cathode ray tubes (CRT) or liquid crystal displays (LCD). Some implementations include devices, for example, a touchscreen that functions as both input and output devices.

Finally, as shown in FIG. 3, bus 310 also couples electronic system 300 to a network (not shown) through a network interface 380. In this manner, the computer can be a part of a network of computers (for example, a local area network (LAN), a wide area network (WAN), or an Intranet, or a network of networks, for example, the Internet. Any or all components of electronic system 300 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A method comprising:
    connecting an admin device of a management system to a peripheral device through a first connection;
    determining a peripheral identifier corresponding to the peripheral device;
    sending the peripheral identifier from the admin device to a management server of the management system, wherein the management system includes the admin device and the management server;
    associating, by the management server, the peripheral identifier with a device identifier corresponding to a user device;
    tracking, by the management server, a policy update performed at the peripheral device;
    determining, by the management server, whether the peripheral device needs an updated policy;
    sending the updated policy, based on the association between the peripheral identifier and the device identifier, from the management server to the peripheral device through the first connection, the updated policy permitting a second connection between the peripheral device and the user device; and
    pairing, through the first connection, the peripheral device with the user device based on the updated policy to establish the second connection between the peripheral device and the user device, the second connection being different than the first connection.

2. The method of claim 1, further comprising sending a second updated policy to the peripheral device through the second connection.

3. The method of claim 1, further comprising sending an updated firmware for the peripheral device to the peripheral device through the second connection.

4. The method of claim 1, wherein pairing the peripheral device with the user device comprises:
    initiating a security handshake operation between the peripheral device and the user device through the first connection; and terminating the first connection to establish the second connection.

5. The method of claim 1, further comprising disconnecting from the peripheral device after pairing the peripheral device with the user device.

6. The method of claim 1, further comprising sending the association between the peripheral identifier and the device identifier to the user device, the peripheral device, or both the user device and the peripheral device.

7. The method of claim 1, wherein the updated policy comprises a whitelist of devices the peripheral device is permitted to connect to, or a blacklist of devices the peripheral device is restricted from connecting to, or both the whitelist of devices and the blacklist of devices.

8. The method of claim 1, further comprising:
disassociating the peripheral identifier and the device identifier;
associating the peripheral identifier with a second device identifier corresponding to a second user device;
sending a second updated policy, based on the disassociation between the peripheral identifier and the device identifier and the association between the peripheral identifier and the second device identifier, to the peripheral device through the second connection; and
pairing, through the second connection, the peripheral device with the second user device based on the second updated policy to establish a third connection between the peripheral device and the second user device.

9. The method of claim 8, further comprising sending a third updated policy to the peripheral device through the third connection.

10. The method of claim 8, further comprising sending an updated firmware for the peripheral device to the peripheral device through the third connection.

11. A non-transitory machine-readable medium comprising instructions stored therein, which when executed by a machine, cause the machine to perform operations comprising:
connecting an admin device of a management system to a peripheral device through a first connection established at the management system;
determining a peripheral identifier corresponding to the peripheral device;
sending the peripheral identifier from the admin device to a management server of the management system, wherein the management system includes the admin device and the management server;
tracking, by the management server, a policy update performed at the peripheral device;
determining, by the management server, whether the peripheral device needs an updated policy;
in response to the determining, updating a policy corresponding to the peripheral device to associate the peripheral device with a device identifier of a user device;
sending the updated policy from the management server to the peripheral device through the first connection;
pairing, through the first connection, the peripheral device with the user device based on the updated policy to establish a second connection between the peripheral device and the user device, the second connection being different than the first connection; and
disconnecting from the peripheral device to terminate the first connection.

12. The non-transitory machine-readable medium of claim 11, wherein the operations further comprise sending a second updated policy or an updated firmware to the peripheral device through the second connection.

13. The non-transitory machine-readable medium of claim 11, wherein the operations further comprise:
connecting to a second user device;
updating the policy to disassociate the peripheral identifier and the device identifier and associate the peripheral identifier with a second device identifier corresponding to the second user device;
sending the updated policy to the peripheral device through the second connection;
pairing, through the second connection, the peripheral device with the second user device based on the updated policy to establish a third connection between the peripheral device and the second user device; and
terminating the second connection.

14. The non-transitory machine-readable medium of claim 13, wherein the operations further comprise:
updating the policy based on changes to a global policy; and
sending the updated policy to the peripheral device through the third connection.

15. The non-transitory machine-readable medium of claim 13, wherein the operations further comprise sending an updated firmware for the peripheral device to the peripheral device through the third connection.

16. A system comprising:
one or more processors; and
a non-transitory machine-readable medium comprising instructions stored therein, which when executed by the processors, cause the processors to perform operations comprising:
connecting an admin device of a management system to a peripheral device through a first connection established at the management system;
sending, from the admin device, a peripheral identifier corresponding to the peripheral device to a management server of the management system, wherein the management system includes the admin device and the management server;
associating, by the management server, the peripheral identifier with a device identifier corresponding to a user device;
tracking, by the management server, a policy update performed at the peripheral device;
determining, by the management server, whether the peripheral device needs an updated policy;
sending the updated policy, based on the association between the peripheral identifier and the device identifier, from the management server to the peripheral device through the first connection east;
pairing, through the first connection established at the management system, the peripheral device with the user device based on the updated policy to establish a second connection between the peripheral device and the user device, the second connection being different than the first connection; and
disconnecting from the peripheral device to terminate the first connection.

17. The system of claim 16, wherein the operations further comprise sending a second updated policy or an updated firmware for the peripheral device to the peripheral device through the second connection.

18. The system of claim 16, wherein the operations further comprise:
connecting to a second user device;

disassociating the peripheral identifier and the device identifier;

associating the peripheral identifier with a second device identifier corresponding to the second user device;

sending a second updated policy, based on the disassociation between the peripheral identifier and the device identifier and the association between the peripheral identifier and the second device identifier, from the management server to the peripheral device through the second connection;

pairing, through the second connection, the peripheral device with the second user device based on the second updated policy to establish a third connection between the peripheral device and the user device; and terminating the second connection.

19. The system of claim 18, wherein the operations further comprise sending a third updated policy or an updated firmware for the peripheral device to the peripheral device through the third connection.

20. The system of claim 18, wherein the operations further comprise sending the association between the peripheral identifier and the second device identifier to the second user device.

* * * * *